United States Patent
von Tardy-Tuch

(10) Patent No.: US 7,331,591 B2
(45) Date of Patent: Feb. 19, 2008

(54) TRANSPORTATION PROTECTION FOR CABLE ENDS ON SHOCK ABSORBER STRUTS

(75) Inventor: Georg von Tardy-Tuch, Malmsheim (DE)

(73) Assignee: Dr. Ing h.c.F. Porsche Aktiengesellschaft, Stuttgart (DE)

( * ) Notice: Subject to any disclaimer, the term of this patent is extended or adjusted under 35 U.S.C. 154(b) by 273 days.

(21) Appl. No.: 11/130,309

(22) Filed: May 17, 2005

(65) Prior Publication Data

US 2006/0022423 A1    Feb. 2, 2006

(30) Foreign Application Priority Data

May 18, 2004    (DE)    ...... 10 2004 024 523

(51) Int. Cl.
    *B60G 15/00*    (2006.01)
(52) U.S. Cl. .............. 280/124.147; 280/124.155
(58) Field of Classification Search ......... 280/124.147, 280/124.155; 188/314, 321.11, 320; 267/320; 206/586, 588, 590, 591, 593, 594, 722–728; 53/129.1, 139.5; 428/131
    See application file for complete search history.

(56) References Cited

U.S. PATENT DOCUMENTS

| | | | | |
|---|---|---|---|---|
| 2,916,296 A | * | 12/1959 | Muller ................. | 280/124.154 |
| 4,958,849 A | * | 9/1990 | Pinch et al. .......... | 280/124.155 |
| 5,400,880 A | * | 3/1995 | Ryan .................... | 188/314 |
| 5,583,733 A | * | 12/1996 | Cronin ................. | 361/111 |
| 5,847,914 A | * | 12/1998 | Johansen et al. .... | 361/111 |
| 5,937,893 A | * | 8/1999 | Herz .................... | 137/382 |
| 6,082,749 A | | 7/2000 | Smith et al. | |
| 6,257,601 B1 | | 7/2001 | Spears et al. | |
| 6,357,564 B1 | * | 3/2002 | Tantius ............... | 188/321.11 |
| 6,485,223 B1 | | 11/2002 | Van Schmus et al. | |
| 7,137,636 B2 | * | 11/2006 | Bennett .............. | 280/124.147 |
| 2004/0140642 A1 | * | 7/2004 | Perello et al. ....... | 280/124.147 |

FOREIGN PATENT DOCUMENTS

| | | |
|---|---|---|
| DE | 72 46 448 U | 10/1973 |
| DE | 33 13 388 C2 | 1/1984 |
| DE | 91 11 106.4 | 1/1993 |
| EP | 1 093 196 A1 | 4/2001 |
| EP | 1 475 873 A1 | 11/2004 |
| FR | 2 768 659 A | 3/1999 |
| JP | 63 116916 A | 9/1988 |
| JP | 2002 019441 A | 7/2000 |
| WO | WO 97/19839 A | 6/1997 |

\* cited by examiner

*Primary Examiner*—Paul N. Dickson
*Assistant Examiner*—Joseph Rocca
(74) *Attorney, Agent, or Firm*—Crowell & Moring LLP

(57) ABSTRACT

A transportation protection for cable ends on shock absorber struts of motor vehicles, wherein the cable end exits from a hollow piston rod. In order to create protection which protects the cable end from damage during transportation, it is proposed that a cover plate be installed at the end of the shock absorber strut at which the cable end exits from a hollow piston rod, with the cover plate being held on the fasteners of the shock absorber strut in such a way that it takes on a curved shape. This is achieved by making the distance between two opposing fastening points on the cover plate greater than the distance between the corresponding fasteners on the shock absorber strut.

10 Claims, 3 Drawing Sheets

TRANSPORTATION PROTECTION FOR CABLE ENDS ON SHOCK ABSORBER STRUTS

This application claims the priority of German Patent Document No. 10 2004 024 523.1, filed May 18, 2004, the disclosure of which is expressly incorporated by reference herein.

BACKGROUND AND SUMMARY OF THE INVENTION

The invention concerns transportation protection for cable ends on shock absorber struts of motor vehicles, wherein the cable end exits from a hollow piston rod. Such shock absorber struts are, for example, shock absorber struts with electrically adjustable damping mechanisms.

Such shock absorber struts have the problem that the cable end can be damaged while the shock absorber strut is being transported. Such damage can only be repaired at great expense, that is, by taking apart the shock absorber strut.

It is the object of this invention therefore to create protection that protects the cable end against damage during transportation.

To that end, it is proposed according to the invention to provide a cover plate at the end of the shock absorber strut at which the cable end exits from a hollow piston rod. The cover plate is held on fasteners of the shock absorber strut in such a way that it assumes a curved shape. This is achieved by making the distance between two opposing fastening points on the cover plate larger than the distance between the corresponding fasteners on the shock absorber strut. In so doing, it is especially advantageous that a simple and easy-to-make cover plate material can be used as transportation protection and can also be stored flat until it is used. The hollow space needed to protect the cable end is only produced by the curving of the cover plate when it is fitted. The cover hereby achieved specifically prevents the cable end from passing over edges, borders and projections of the shock absorber strut and being squeezed between these edges, borders or projections and a transportation device and thereby being damaged. The cable end is also prevented from being snagged when the shock absorber strut is lifted.

Thus the cover plate has preferably three fastening points. This design is especially advantageous with respect to the curving of the cover plate: the curving is produced by two of the fastening points while the third fastening point serves for more secure attachment.

The fasteners on the shock absorber strut preferably involve screws or bolts. In this case the fastening points of the cover plate are openings designed to have a smaller diameter than the diameter of the screws or bolts and provided with at least one side slit. When the cover plate is pushed down onto the screws or bolts, the edges of the openings are pushed up and hook onto the screws or bolts so that a good hold is guaranteed.

Another opening can also be provided on the cover plate which can also at least be provided with at least one side slit. This opening serves as a receptacle for a plug on the end of the cable end with this plug being held in position by being placed in this opening. Securing the plug also holds the rest of the cable end in position.

The cover plate is preferably made of cardboard since this material is easy to make, easy to work and can be disposed of in an environmentally friendly manner.

Other objects, advantages and novel features of the present invention will become apparent from the following detailed description of the invention when considered in conjunction with the accompanying drawings.

DETAILED DESCRIPTION OF THE DRAWINGS

Figure 1:
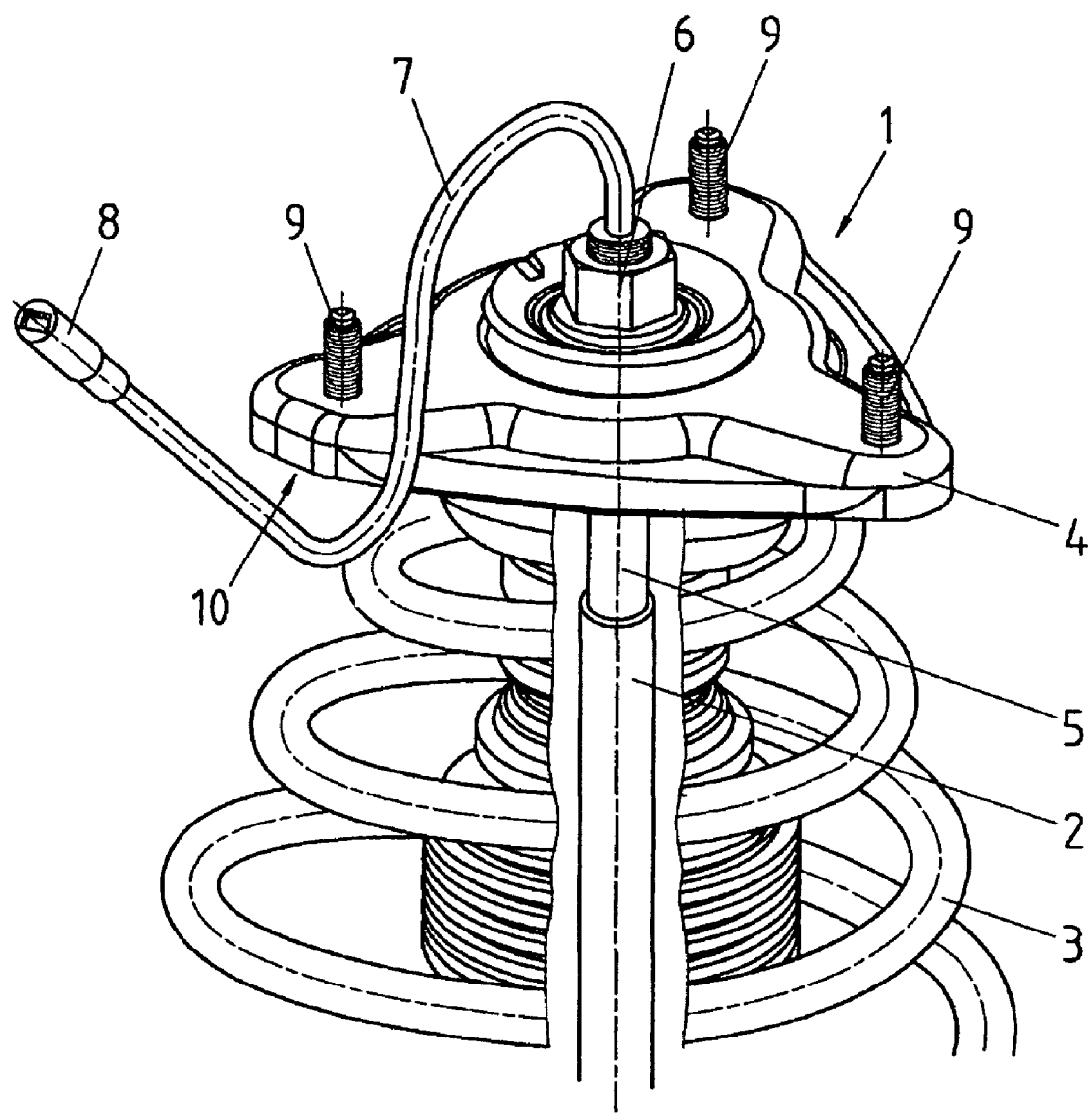
FIG. 1 is an upper area of a shock absorber strut with a cable end.

The shock absorber strut 1 shown in FIG. 1 only in the area of its end area consists of damper 2, spring 3 and support bearing 4. Piston rod 5 of damper 2 is bolted to support bearing 4, with only nut 6 being shown here. Piston rod 5 is hollow in design to allow for passage of a cable, of which only cable end 7 protruding from piston rod 5 is visible in this figure. On the end, cable end 7 is provided with plug 8. To attach support bearing 4 to a car frame (not shown), three fasteners, in this case screws 9, are provided which are rigidly connected to support bearing 4.

Figure 2:
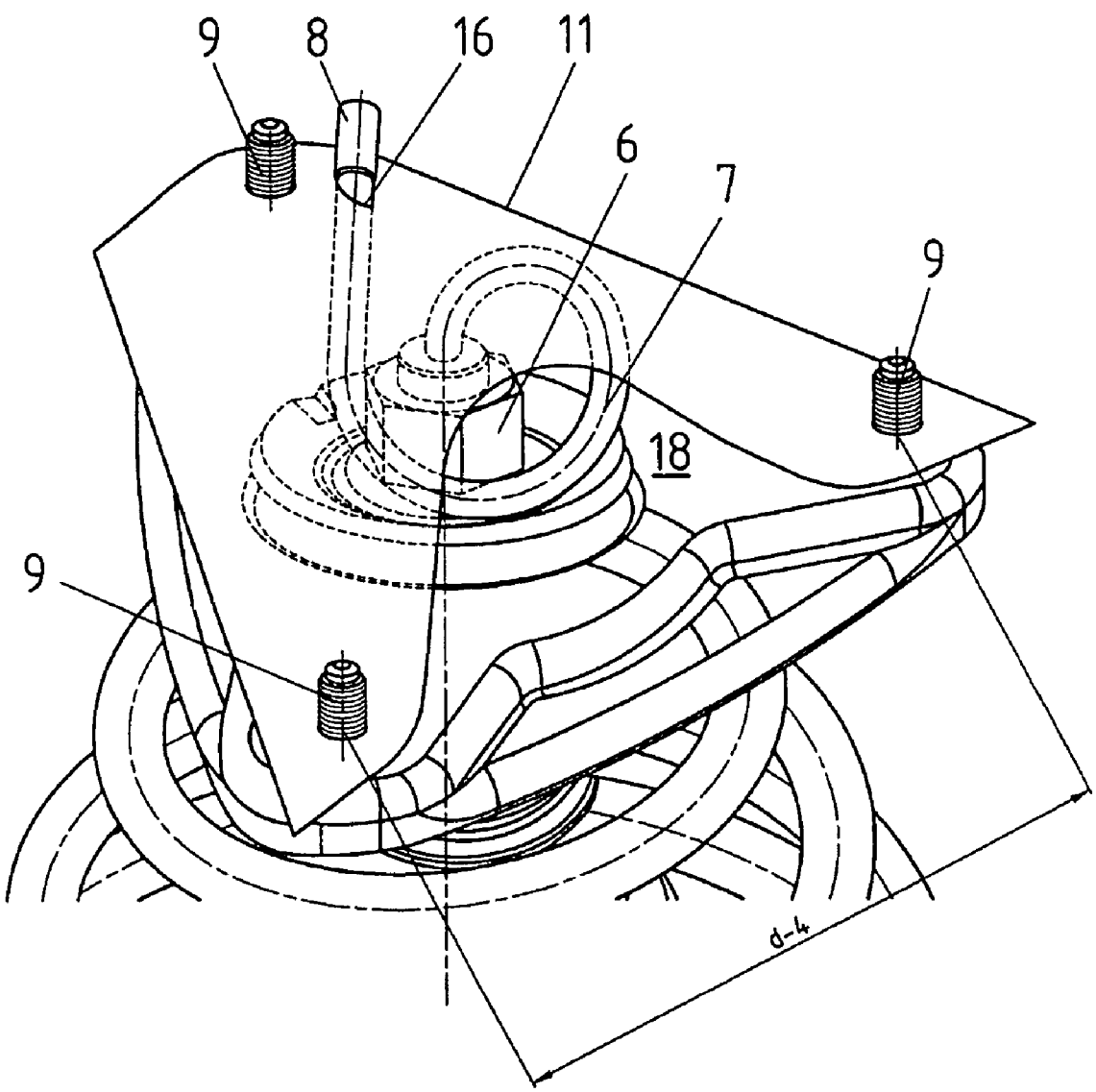
FIG. 2 is a top transverse view of a support bearing of the shock absorber strut with transportation protection according to the invention.

In order to prevent cable end 7 from passing over an edge 10 of support bearing 4 during the transportation of shock absorber strut 1, as shown for example in FIG. 1, and there possibly being squeezed when edge 10 strikes a transportation device, cover plate 11 shown in FIG. 2 is held on screws 9 as transportation protection.

Figure 3:
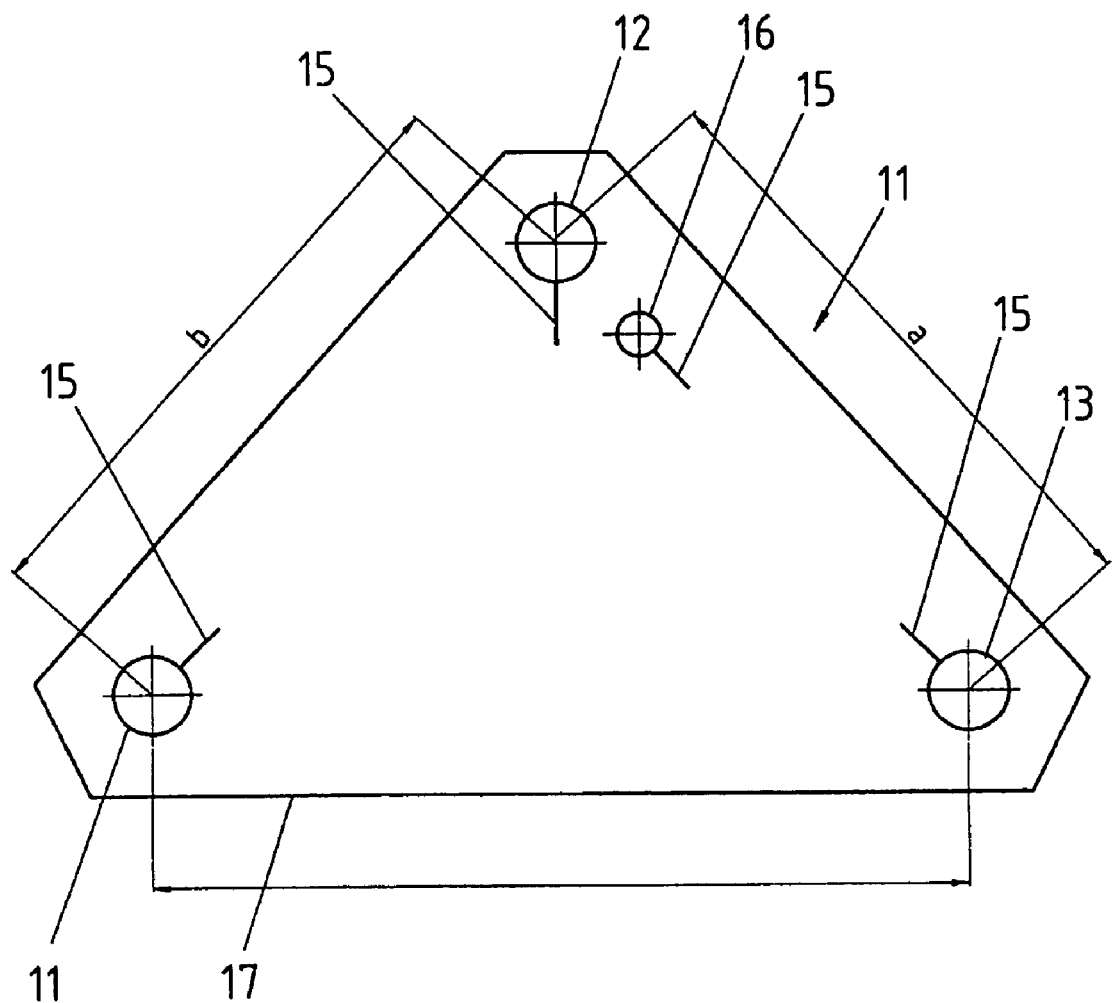
FIG. 3 is an unmounted cover plate for use as transportation protection.

FIG. 3 shows cover plate 11 in the unmounted state, i.e., lying flat. Cover plate 11 has a basically triangular plan, with openings 12 through 14 being placed in the area of the corners as fastening points. Each of openings 12 through 14 has a diameter smaller than the diameter of screws 9. Slits 15 in cover plate 11 extend from the edge of openings 12 through 14 toward the middle of cover plate 11. The distances between openings 12 through 14 are designated a, b and c.

A fourth opening 16 is provided in the area of first opening 12 in cover plate 11 and also provided with a slit 15. The diameter of fourth opening 16 is somewhat smaller than the diameter of plug 8.

Screws 9 are, as can be seen in FIG. 2, distributed evenly over the perimeter of support bearing 4 and are at distance d from one another. On cover plate 11, distances a and b are such that they correspond to distance d. Distance c is greater than distance d. When openings 12 through 14 are placed onto screws 9, there develops, in the area of a front edge 17 of cover plate 11 which has distance c, an upward curvature which forms a hollow to receive cable end 7.

As shown by FIG. 2, the plug 8 is kept in the opening 16 in the mounted state of the cover plate 11 and rolled up the cable end 7 is completely contained under the curvature 18 so that the cover plate 11 acts as transportation protection for the cable end 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Transportation protection for use on a cable end on a motor vehicle shock absorber strut in which the cable end exits from a hollow piston rod, comprising a cover plate configured to be held on the shock absorber strut with fastening points corresponding to fasteners of the shock absorber strut in the area where the cable end exits from the piston rod, wherein the distance between two opposing fastening points is selected to be greater than the distance between the corresponding fasteners on the shock absorber strut, and the fastening points of the cover plate are openings in the cover plate that have a smaller diameter than a diameter of the fasteners on the shock absorber strut and are provided with at least one side slit.

2. Transportation protection according to claim 1, wherein the cover plate has three fastening points.

3. Transportation protection according to claim 1, wherein the fastening points are configured to have a diameter smaller than the diameter of the fasteners of the shock absorber strut and wherein the fasters are screws or bolts.

4. Transportation protection according to claim 1, wherein a further opening is provided on the cover plate into which a plug at the end of the cable end can be plugged.

5. Transportation protection according to claim 1, wherein the cover plate is made of cardboard.

6. A transportation protection for a cable end of a motor vehicle shock absorber strut that has a hollow piston rod and fasteners with the cable end exiting from the hollow piston rod and the fasteners positioned in an area where the cable end exits from the hollow piston rod, comprising a cover plate including fastening points that correspond to the fasteners for holding the cover plate on the shock absorber strut, wherein the distance between two of the fastening points is greater than a distance between the corresponding fasteners of the shock absorber strut prior to holding the cover plate to the shock absorber strut, and the fastening points are openings on the cover plate that have a diameter smaller than a diameter of the fasteners on the shock absorber strut and are provided with at least one side slit.

7. The transportation protection according to claim 6, wherein the cover plate has three fastening points.

8. The transportation protection according to claim 6, wherein the fastening points are configured to have a diameter smaller than the diameter of the fasteners on the shock absorber strut when each of the fasteners is a screw or a bolt.

9. The transportation protection according to claim 6, wherein the cover plate includes a further opening into which a plug at the end of the cable end can be plugged.

10. The transportation protection according to claim 6, wherein the cover plate is made of cardboard.

* * * * *